(12) United States Patent
Wang et al.

(10) Patent No.: US 12,013,847 B2
(45) Date of Patent: Jun. 18, 2024

(54) FAST PROCESSING METHOD OF MASSIVE TIME-SERIES DATA BASED ON AGGREGATED EDGE AND TIME-SERIES AGGREGATED EDGE

(71) Applicant: ZHEJIANG BANGSUN TECHNOLOGY CO., LTD., Hangzhou (CN)

(72) Inventors: Xingen Wang, Hangzhou (CN); Xinyu Wang, Hangzhou (CN); Ping Lu, Hangzhou (CN); Wei Chen, Hangzhou (CN); Gang Wang, Hangzhou (CN)

(73) Assignee: ZHEJIANG BANGSUN TECHNOLOGY CO., LTD., Hangzhou (CN)

( * ) Notice: Subject to any disclaimer, the term of this patent is extended or adjusted under 35 U.S.C. 154(b) by 197 days.

(21) Appl. No.: 17/358,017

(22) Filed: Jun. 25, 2021

(65) Prior Publication Data

US 2021/0319014 A1   Oct. 14, 2021

Related U.S. Application Data

(63) Continuation of application No. PCT/CN2019/130147, filed on Dec. 30, 2019.

(51) Int. Cl.
G06F 16/242 (2019.01)
G06F 16/2458 (2019.01)
(Continued)

(52) U.S. Cl.
CPC ........ *G06F 16/244* (2019.01); *G06F 16/2477* (2019.01); *G06F 16/288* (2019.01); *G06F 16/9024* (2019.01); *G06F 16/9035* (2019.01)

(58) Field of Classification Search
CPC .. G06F 16/244; G06F 16/2477; G06F 16/288; G06F 16/902
(Continued)

(56) References Cited

U.S. PATENT DOCUMENTS

| 2016/0162543 | A1* | 6/2016 | Gustafson | G06F 16/2455 707/769 |
| 2019/0370818 | A1* | 12/2019 | Cole | G06Q 30/018 |
| 2020/0104402 | A1* | 4/2020 | Burnett | G06F 16/2477 |

FOREIGN PATENT DOCUMENTS

| CN | 103593433 A | 2/2014 |
| CN | 104867055 A | 8/2015 |

(Continued)

OTHER PUBLICATIONS

International Search Report (PCT/CN2019/130147); Date of Mailing: Feb. 29, 2020.

*Primary Examiner* — Giovanna B Colan
(74) *Attorney, Agent, or Firm* — W&G Law Group

(57) ABSTRACT

A fast processing method of massive time-series data based on aggregated edges and time-series aggregated edges implements fast and real-time processing based on an association of a graph data structure under a massive data pattern. In terms of incremental flow calculation based on time windows, the present disclosure proposes an innovative data structure of "aggregated edge" and "time-series aggregated edge", which is suitable for data modeling of real-time dynamic graph. The present disclosure introduces a time-series graph query language, which adds descriptive semantics of time series information, and not only supports basic queries based on vertices, edges, and attributes, but also can implement users' graph queries for index calculation results in a time window. The graph query includes graph matching and graph filtering. The present disclosure is especially suitable for fields such as marketing and real-time risk (Continued)

control based on massive data mining and has good timeliness control and high scalability.

8 Claims, 3 Drawing Sheets

(51) Int. Cl.
*G06F 16/28* (2019.01)
*G06F 16/901* (2019.01)
*G06F 16/9035* (2019.01)

(58) Field of Classification Search
USPC .......................................................... 707/769
See application file for complete search history.

(56) References Cited

FOREIGN PATENT DOCUMENTS

| CN | 106682986 A | 5/2017 |
| CN | 109164980 A | 1/2019 |

\* cited by examiner

Simple edge-based processing

Aggregated edge-based processing

Simple edge-based processing

Aggregated edge-based processing

Simple edge-based processing

Aggregated edge-based processing

Simple edge-based processing

Aggregated edge-based processing

FAST PROCESSING METHOD OF MASSIVE TIME-SERIES DATA BASED ON AGGREGATED EDGE AND TIME-SERIES AGGREGATED EDGE

TECHNICAL FIELD

The present disclosure provides a fast processing method of massive time-series data based on an aggregated edge and a time-series aggregated edge. The method includes corresponding approaches such as modeling based on a graph data structure, dynamic mapping, aggregated edge and time-series aggregated edge, and graph association query and pattern matching based on the aggregated edge. The method is mainly applicable to finance, electricity/energy, transportation, Internet and other fields, and conducts real-time analysis on associations in time-series data.

BACKGROUND

In some fields such as financial real-time risk control or precision marketing, some calculation may often perform on associations, such as for some users "shops in which the user has consumed in the past 24 hours" and "counterparties who receives a cumulative transfer amount of more than 1 million yuan in the past 180 days". In addition, such fields may also involve pattern matching based on associations, such as whether a user "has transferred some money to another user's account more than 100 times in the past week".

In a solution of association queries, simple queries can be performed by joining a database-based table structure to another table. In complex business scenarios, there are many different types of entities and many different types of relations. Because a database table is essentially based on binary relations, the database table-based join operation may be very complex. Thus, the query performance on response may not satisfy business requirements. Generally, the associations in the complex business scenarios may be technologically modeled into a graph structure. Graph is a data structure composed of vertices and edges in computer science. A graph database is a database that uses a graph data structure for semantic queries, which uses vertices, edges, and attributes to represent and store data. In a modeling process of business scenarios, an attribute graph model is generally chosen for modeling. In an attribute graph, vertices represent entities, and edges represent relations. Vertices or edges may have zero, one, or more attributes, and an entity's attribute key is unique. For example, in a business scenario of transactions, the attribute graph model may take users as vertices and transactions that have occurred as edges. The attributes on the edges may record transaction details (transaction amount, transaction location, and the like). If more than one transaction occurs between two users, a plurality of edges may be established to indicate relations.

In a technical solution of modeling with an attribute graph model for a generic graph database product, the association calculation has several major defects, which are respectively as follows.

1. In the case of a large amount of data in a query result set, the response time is long, which cannot satisfy business requirements on a real-time response time constraint. In a real business scenario, in the case of a query for objects with an association caused by transactions in the past 30 days, query calculation of the association cannot be completed on a single clustering vertex due to a huge transaction flow volume in the past 30 days.

2. A graph database product converts all data information into vertices, edges, and attributes and puts them into a graph library, which has an advantage that transaction information in a graph database is complete and easy to display. However, the disadvantage of the graph database product is too comprehensive data, which takes some time to filter out data needing to be calculated.

3. A large-scale calculation device is required. Since intensive calculations based on a graph data structure are required in the processing method, it is generally necessary to build a large-scale cluster and framework based on graph computing framework, to solve the problem. Thus, large hardware costs and middleware maintenance costs are required.

4. Current graph database products lack an aggregation capability based on time-series. In a scenario for business query aggregated based on time-series, aggregate calculation needs to be performed simultaneously with the query process, which causes delay of the query. Many graph database products cannot even produce real-time query results in the case of massive data.

SUMMARY

With respect to the problem in processing massive time-series data by a graph database or graph computing middleware product at present, a fast processing method of massive time-series data association based on an aggregated edge and a time-series aggregated edge is provided according to the present disclosure, so as to implement a fast and real-time processing of associations based on a graph data structure under a massive data pattern.

In terms of incremental streaming calculation based on a time window, an innovative data structure of "aggregated edge" and "time-series aggregated edge" is provided in the present disclosure, which is suitable for data modeling of real-time dynamic graphs. The present disclosure also introduces a time-series graph query language, which adds descriptive semantics of time series information. The time-series graph query language not only supports basic queries based on vertices, edges, and attributes, but also can implement users' graph queries for index calculation results in a time window. The graph query includes graph matching and graph filtering.

The objective of the present disclosure is achieved through the following technical solution. A fast processing method of massive time-series data based on an aggregated edge and a time-series aggregated edge includes:

aggregating time-series data based on a time window, to obtain an aggregation result;

generating aggregated edges and time-series aggregated edges by using the aggregation result, and storing data into a memory according to a data structure of the aggregated edge;

establishing a graph relationship in a form of an attribute graph by the aggregated edges or the time-series aggregated edges; and performing a quick query on the generated graph relationship based on an aggregation index.

Further, the generating aggregated edges includes: in a process of building an association graph, performing an aggregate calculation in advance according to pre-selected and defined attribute fields in a business; and forming aggregate calculation results on edge attributes.

Further, the generating time-series aggregated edges includes: dividing continuous time into a series of time windows with a fixed length, in a specified time unit; assigning all time-series data to corresponding time windows according to a value of an agreed time attribute field; and aggregating data in respective time windows according to a business-required aggregation algorithm, to obtain aggregated values corresponding to the respective time windows.

Further, different aggregation algorithms are adopted for different calculation indices according to different calculation business requirements of the calculation indices, the aggregation algorithms include one or more of count, summation, average, maximum, minimum, variance, standard deviation, collection and deduplication collection. The different calculation indices are assigned different time window lengths according to business meanings of calculation indices.

Further, data of the aggregated edge is queried by a graph association query language, and the graph association query language adds descriptive semantics of time series information, to query based on vertices, edges, and attributes.

Further, a graph query performs on index calculation results in a time window by a user, and the graph query includes graph matching and graph filtering.

Further, the graph association query language supports predicate filtering semantics, and matching based on edges with indefinite steps.

Further, the graph matching includes: setting a starting point and a graph pattern to be matched, and returning an entity object that satisfies a graph pattern to be matched.

Further, the graph filtering includes: calculating, based on the graph matching, a specified subset of results under a filtering condition.

Further, in the graph filtering, the filtering condition specifies a time window that is possibly different from a time window during the graph matching.

The present disclosure has the following beneficial effects. According to the present disclosure, the "aggregated edge" and "time-series aggregated edge" technologies on the basis of aggregate calculation results based on a time window are very suitable for fields such as real-time precision marketing and real-time risk control based on massive data mining. The advantages brought by the technologies are self-evident and can be summarized as follows.

The technologies have good timeliness control. The technologies may involve graph structure-based traversal in a calculation process of association. Due to aggregation calculation results in advance, the amount of calculation in a graph traversal process is greatly reduced. The size of space in a graph search can be reduced through aggregation results.

The technologies have high scalability. In the case of an increase of calculation variables and business scale, the computing power can be improved by simply adding a calculation device and distributed storage memory, so as to ensure the controllable delay of complex logic calculation.

BRIEF DESCRIPTION OF DRAWINGS

In order to more clearly illustrate technical solutions in embodiments of the present disclosure or the prior art, the accompanying drawings used in the embodiments or the prior art are briefly introduced as follows. Apparently, the drawings described as follows are merely part of the embodiments of the present disclosure. Those of ordinary skill in the art can also obtain other drawings according to these drawings without paying creative efforts.

DESCRIPTION OF EMBODIMENTS

In order to make the above objectives, features and advantages of the present disclosure more obvious and understandable, specific implementations of the present disclosure are described in detail with reference to the drawings.

Many specific details are set forth in the following description to facilitate a full understanding of the present disclosure, but the present disclosure may also be implemented in other manners other than those described herein. Those skilled in the art can make similar promotion without departing from the connotation of the present disclosure, so the present disclosure is not limited by specific embodiments disclosed below.

Figure 1:
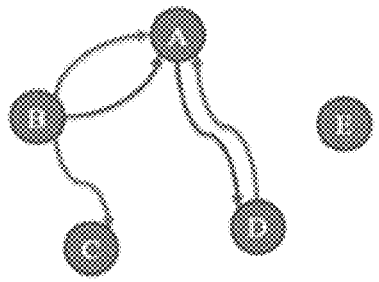
FIG. 1 is a schematic comparison diagram of a simple edge and an aggregated edge according to an embodiment of the present disclosure.
Figure 1:
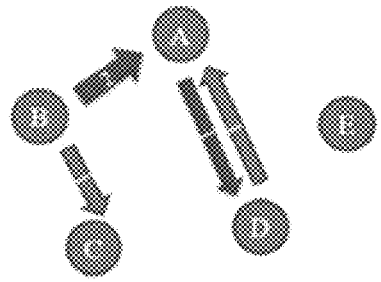
Figure 1:
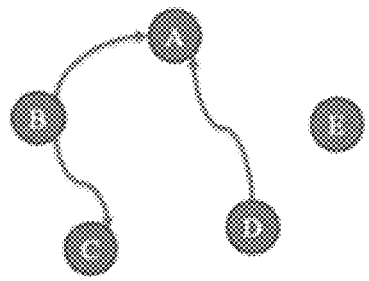
Figure 1:
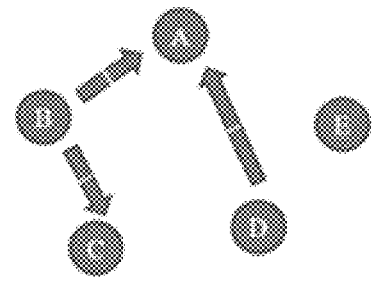
Figure 1:
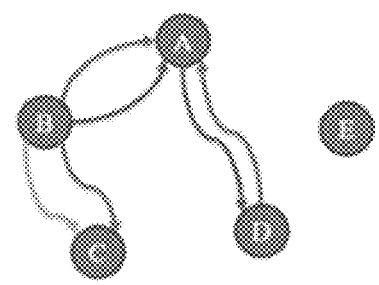
Figure 1:
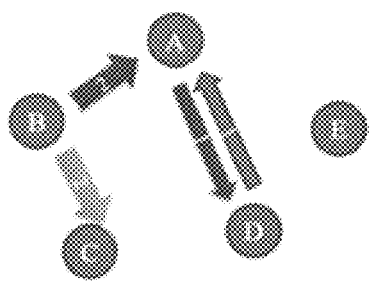
Figure 1:
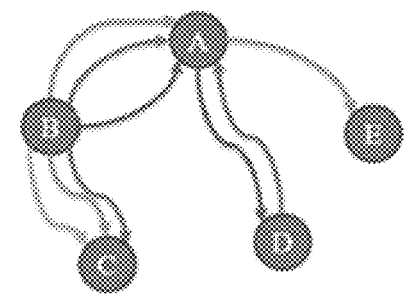
Figure 1:
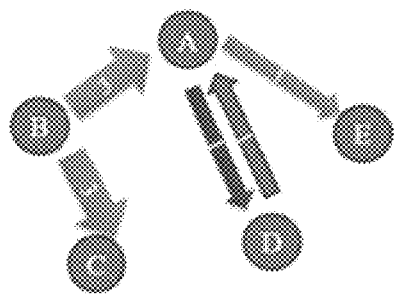

FIG. 1 shows a process of establishing a graph relation data structure according to the present disclosure, which compares with the process of building a general graph database. The innovation of the present disclosure lies in an innovative concept of "aggregated edge" embodied in a process of generating a graph data structure.

A processing method of "simple edge" is commonly used to build a traditional graph structure. The concept of "aggregated edge" proposed in the present disclosure is that in the process of building a graph, aggregate calculation can be performed in advance according to pre-selected and defined attribute fields in a business. For example, according to the present disclosure, in the process of building an association graph of transaction and transfer, not only a relation between transaction details of both parties is simply recorded; but also for example, when variable such as the number of transfers will be calculated, a the number of transfers can be aggregated in advance to form an "aggregated edges" of aggregation calculation results on edge attributes, according to index requirements of a business query.

On the basis of the "aggregated edges", a concept of "time slice" is combined in the present disclosure, to expand the concept of "aggregated edge". Thus, a concept of "time-series aggregated edge" is introduced. The "time slice" refers to cutting a continuous period of time in units of time (e.g., day, hour, past 30 minutes, etc.) to form a series of time windows with a fixed length. All data is assigned to corresponding time windows based on a value of an agreed time attribute field (such as transaction time or event occurrence time). The data in one time window is aggregated according to business requirements, to obtain an aggregated value for this time window. Different calculation indices may correspond to different aggregated value algorithms according to different calculation business contents thereof. Further, the different calculation indices may be assigned different time slice lengths according to business meanings thereof.

According to a graph model structure and a storage method in the present disclosure, results of calculation indices are stored in system memory in the data structure concept of "time-series aggregated edge". The result of "time-series aggregated edge" may be further applied to calculation of various real-time associations or real-time decision-making.

Figure 2:
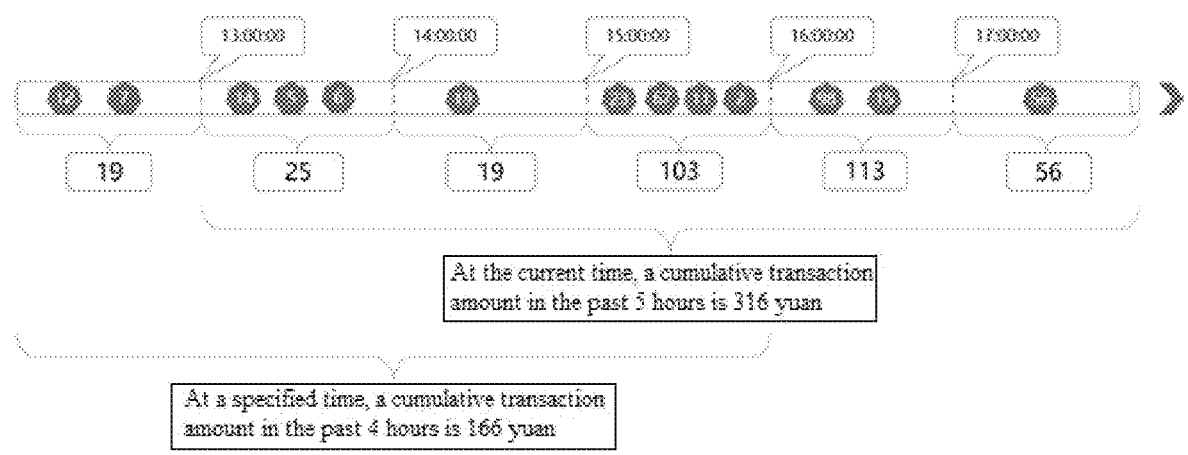
FIG. 2 is a schematic diagram of implementation of time-series aggregated edges in a simple business scenario.

As shown in FIG. 2, an implementation example of "time-series aggregated edge" according to the present disclosure is given. It is assumed that an account A made the following transfer flow to an account B within six hours, and numbers represent a transfer amount. A query index is the total amount of money transferred from the account A to the account B within specified hours. A time window length is defined as 1 hour. Herein, the number of data entries is 13 and the number of time windows is 6. In the present disclosure, 13 pieces of original data is not directly stored, but aggregation results of each time window are stored, which are called aggregated values. The total number of aggregation results is 6. In response to a query, these aggregated values are used to perform some calculation (summation in this example) according to a predetermined algorithm. As can be seen, in the query process, the calculation amount is much less than the calculation performed with the original data. Therefore, regardless of time and space, the consumption of the present disclosure is less than that of other graph databases. Aggregation results of the time windows of various data are calculated from information (amount) on an association (transfer) between entities (accounts) according to a predefined index (cumulative amount), and are stored in the system memory, that is, "time-series aggregated edge" is formed.

Figure 3:
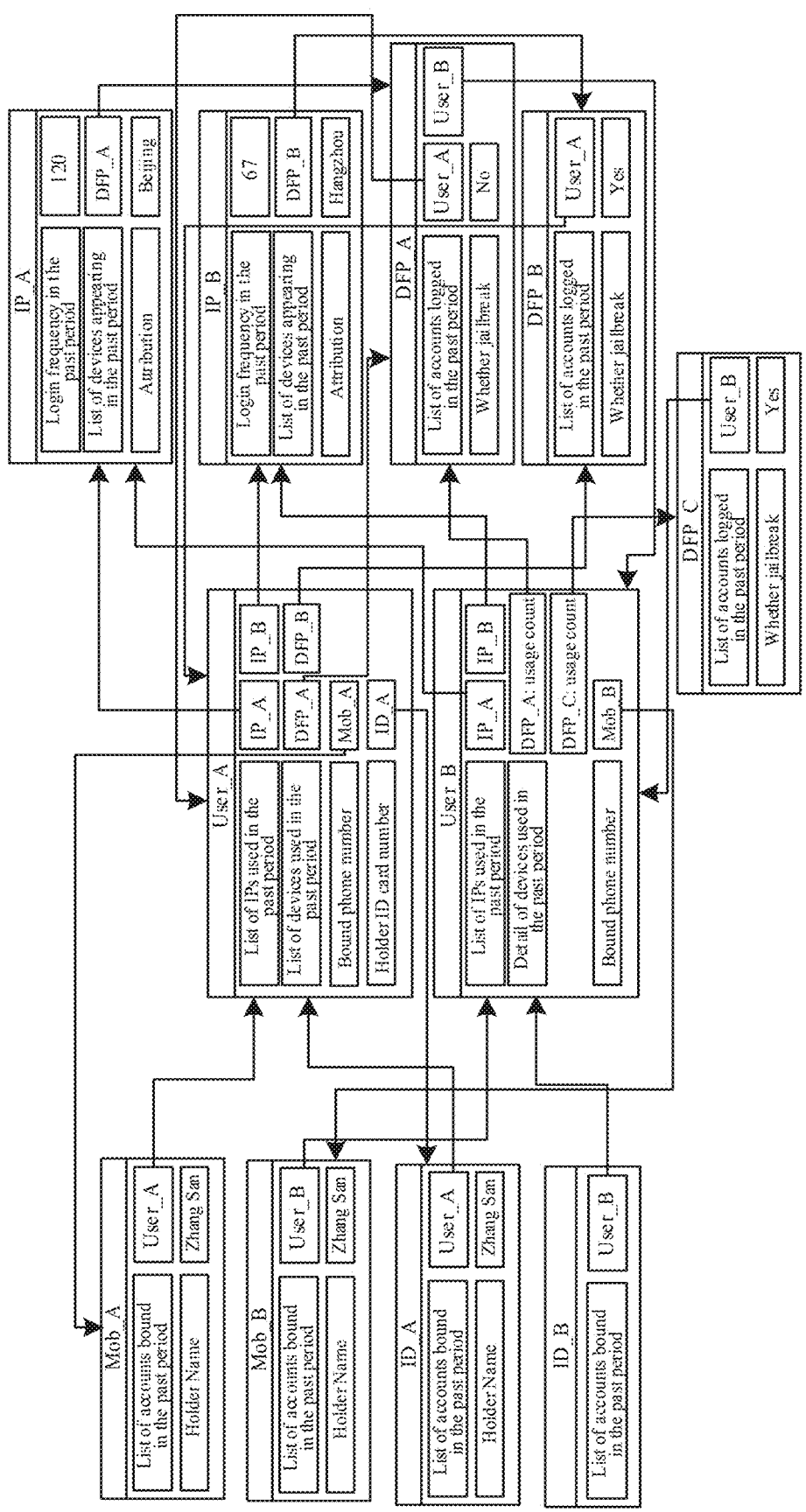
FIG. 3 is a schematic diagram of implementation of time-series aggregated edges in a complex business scenario.

FIG. 3 further shows a complex business scenario. Vertices shown in the drawings represent different entities in the business scenario. Some vertices are based on user dimensions, and some are based on IP address dimensions. All indices and associations (such as a login frequency of IP_A and a list of devices that have appeared in the past period) have time series information. That is, results in that period can be displayed according to different time windows specified. According to business requirements, the aggregation results are stored in the memory for further query, by using the "time-series aggregated edge" technology.

In order to make it easy for users to query for data of the "time-series aggregated edge", the present disclosure also introduces a new graph association query language is introduced into the present disclosure, which is matched with the query. The query language is similar to the Cypher query language in syntax. The graph association query language not only supports basic queries of definite vertices, edges and attributes, but also adds descriptive semantics of time series information, so that the users can conduct a graph query based on index calculation results in a certain time window. The graph query includes graph matching and graph filtering. The present disclosure further supports predicate filtering semantics such as "all" and "any", and pattern matching based on edges with indefinite steps. This greatly enhances the technical support of the present disclosure for the business scenario.

The following table shows examples of several query languages:

| Query semantics | SCL language |
| --- | --- |
| All merchants associated with an account 123 | MATCH (user:PAY_USER{key: '123'}) RETURN user.TRANS; |
| Cumulative transaction amount and number of transactions of the account 123 in the past 12 hours from 2019-01-10 12:00:00 | WATCH date('2019-01-01 12:00:00'), '12 h' MATCH (mer:PAY_MER{key: '123') RETURN mer.MER_TRANS_AMOUNT, mer.MER_TRANS_COUNT |
| Cumulative transaction amount in the past 12 hours of all merchants associated with the account 123 in the past 12 hours | WATCH'12 h' MATCH (user:PAY_USER{key: '123'})-[:TRANS]-(merchants:PAY_MER) RETURN merchants.MER_TRANS_AMOUNT; |
| Account numbers, of which any transfer amount is more than 500 yuan, in a transfer chain starting from the account 123 in the past 12 hours | WATCH'12 h' MATCH p=((node0:PAY_USER{key:'123'})-[*{eLabel'PAY_USER'}]-(node1)) WHERE all(edge in edges(p) WHERE edge.TRANS_AMOUNT > 500) RETURN node1.key |

The graph matching in the present disclosure includes: setting a starting point and a graph pattern to be matched, and returning an entity object that satisfies a matched pattern. It takes "find out all merchants that have spent money with bank cards bound with an account number 123 in the past 24 hours" as an example. Here, "bank cards bound with an account number" and "merchants that have spent money with bank cards" are two associations. The graph association query language in the present disclosure can be used to describe such serial associations and match results.

The graph filtering in the present disclosure refers to calculating, based on the graph matching, a specified subset of results according to a filtering condition. For example, a condition "find out a subset of merchants whose cumulative transaction amount in 3 months is more than 100,000 yuan" can be added to the above example. The filtering condition may also specify a time window, which may be different from a time window used during the graph matching (3 months and 24 hours).

The aggregate calculation in the present disclosure refers to a capacity of aggregate computing on the "time-series aggregated edge"; also refers to the calculation or aggregate calculation on indices of different points and edges. For example, "a set S of accounts to which an account X with an account number of 123 has been transferred in the past 24 hours is found out, and a maximum transfer amount of X minus c is calculated to obtain a result, where c is an average of a maximum transfer amount of all elements in S". The "maximum" in the above example is specific to a certain account, which exists in the "time-series aggregated edge" and is an aggregated value on the time-series aggregated edge. Thus, it can be acquired directly from graph cube memory data. The "average" is obtained by performing an aggregate operation on the set S. This aggregate operation is performed in an execution plan of the graph association query language in the present disclosure, which is an aggregate calculation among different point indices. The "minus" is general calculation between intermediate results.

The graph query in the present disclosure is to return the result of the above operation to a querier, or to send the result to other modules as a feature for further graph analysis.

In order to show the performance improvement of the proposed "aggregated edge" and "time-series aggregated edge" technologies for association queries by the comparison, a comparative performance test is also performed with open source software Neo4j. Neo4j is a high-performance open source NoSQL graph database. Because the open source Neo4j does not support horizontal scaling, the test is performed on a single vertex. The test focuses on the efficiency of graph building and queries of business scenarios.

A common transaction flow in financial scenarios is adopted in the test, and the data structure is shown in the following table:

| Field | Type | Remarks |
| --- | --- | --- |
| transTime | Long | Transfer time |
| fromCardNo | String(32) | Card number of transfer initiator (payer) |
| toCardNo | String(32) | Card number of transfer receiver (payee) |
| transAmt | Long | Transfer amount, in units of cents |
| channel | String(4) | Channel code |
| bizCode | String(3) | Business code corresponding to the transaction |
| stat | Integer | Transaction status, 0: successful, 1: insufficient balance |

The performance comparison of graph building adopts a Benchmark tool to load a transaction flow of 100 million for graph building and evaluate the efficiency of graph building. Neo4j completes graph building of 100 million pieces of data, which takes 6153.544 s. The method according to the present disclosure completes graph building of 100 million pieces of data, which takes 1026 s. The response time is counted with 90 pieces of data, and the performance comparison is shown in the following table:

| | Graph building efficiency | | | |
| --- | --- | --- | --- | --- |
| | Average number of transactions per second (TPS) | Average response time | Minimum response time | Maximum response time |
| Neo4j | 16250.8 | 24.120 ms | 2.000 ms | 15627.000 ms |
| Method of the present disclosure | 97465.9 | 0.816 ms | 0.047 ms | 19.832 ms |

On the graph relation query scenario, the comparison is performed on the following three business scenarios.

Business scenario 1: In the past 4 days, starting from any payer card number A, in no more than 4 layers, and there is a card number B, where B meets a condition that the total amount of payment from a consumption channel except Web is not equal to 600 yuan in the past 1 day; the total amount of payment from a consumption channel except Web is not equal to 7000 yuan in the past n days (n=2, 3, 4, 5); and the total amount of payment is not equal to 10000 yuan in the past n days (n=2, 3, 4, 5).

Business scenario 2: In the past 4 days, starting from any payer card number A, in no more than 4 layers, and the correlation between a cumulative collection amount and a cumulative payment amount of each vertex of the graph in the past 2 days is no more than 90%.

Business scenario 3: In the past 4 days, starting from any payer card number A, in no more than 4 layers, there are adjacent payers and payees in a transaction link, and both of payers and payees meet a condition that the standard deviation of the transaction amount in the past 2 days is greater than 10.0 and an average value is less than 13000 yuan.

| | | Graph query efficiency | | | |
| --- | --- | --- | --- | --- | --- |
| | | Average number of transactions per second (TPS) | Average response time | Minimum response time | Maximum response time |
| Neo4j | Business scenario 1 | 1.8 | 13.779 s | 0.003 s | 32.982 s |
| | Business scenario 2 | 1.9 | 12.178 s | 0.003 s | 28.975 s |
| | Business scenario 3 | 0.02 | 92.404 s | 3.621 s | 180.193 s |
| Method of the present disclosure | Business scenario 1 | 19.4 | 2.462 s | 0.002 s | 17.868 s |
| | Business scenario 2 | 270.1 | 0.178 s | 0.001 s | 3.431 s |
| | Business scenario 3 | 30.1 | 1.592 s | 0.002 s | 15.396 s |

As can be seen from the above test results, the method in the present disclosure has a larger average number of transactions per second and a shorter response time. This proves that "aggregated edge" and "time-series aggregated edge" proposed in the present disclosure can accelerate association queries of massive time-series data. Moreover, compared with the open source Neo4j graph database, the method according to the present disclosure further supports horizontal expansion into clusters. The performance of the clusters is utilized to further enhance the support for a processing capacity of massive data.

The above are only preferred implementations of the present disclosure. Although the present disclosure has been disclosed above with preferred embodiments, the embodiments are not intended to limit the present disclosure. Any person skilled in the art may, without departing from the scope of the technical solutions of the present disclosure, make many possible changes and modifications to the technical solutions of the present disclosure, or modify the technical solution into equivalent embodiments of equal changes, using the methods and technical contents disclosed above. Therefore, any simple alterations, equivalent changes and modifications made to the above embodiments in accordance with the technical essence of the present disclosure without departing from the contents of the technical solutions of the present disclosure shall still fall within the protection scope of the technical solutions of the present disclosure.

What is claimed is:

1. A fast processing method of massive time-series data based on aggregated edges and time-series aggregated edges, comprising:
   aggregating time-series data based on a time window, to obtain an aggregation result;
   in a process of building an association graph, performing an aggregate calculation in advance according to pre-selected and defined attribute fields in a business, forming aggregate calculation results on edge attributes as aggregated edges, generating time-series aggregated edges by using the aggregation result, and storing data into a memory according to a data structure of the aggregated edges, wherein the attribute fields correspond to index requirements of a business query;

establishing a graph relationship structure in a form of an attribute graph, by the aggregated edges or the time-series aggregated edges, wherein the graph relationship structure comprises at least two nodes representing entities and an aggregated edge or a time-series aggregated edge, and the aggregated edge or the time-series aggregated edge comprises an aggregated value and an association between the two nodes; and performing a quick query on the generated graph relationship based on an aggregation index;

wherein data of the aggregated edges is queried by a graph association query language, and the graph association query language adds descriptive semantics of time series information, supports queries based on vertices, edges, and attributes, and is used to describe serial associations;

wherein the method is applied to scenarios of transaction and transfer, the two nodes represents two users, the aggregated edges comprise transaction amount, transaction number, transaction time, and aggregate calculation results related to a transaction between the two users, the time-series aggregated edges comprise transaction amount, transaction number, transaction time, a series of time windows, and aggregate calculation results corresponding to each time window;

and wherein in response to the transaction between the two users, the graph association query language supports semantic filtering and pattern matching based on edges with indefinite steps.

2. The method according to claim 1, wherein the generating time-series aggregated edges comprises: dividing continuous time into the series of time windows with a fixed length, in a specified time unit; assigning all time-series data to corresponding time windows according to a value of an agreed time attribute field; and aggregating data in respective time windows according to a business-required aggregation algorithm, to obtain aggregated values corresponding to the respective time windows.

3. The method according to claim 2, wherein different aggregation algorithms are adopted for different calculation indices according to different calculation business requirements of the calculation indices; and the different aggregation indices are assigned different time window lengths according to business meanings of the calculation indices.

4. The method according to claim 1, wherein a graph query is performed on index calculation results in a time window by a user, and the graph query comprises graph matching and graph filtering.

5. The method according to claim 4, wherein the graph matching comprises: setting a starting point and a graph pattern to be matched, and returning an entity object that satisfies the graph pattern to be matched.

6. The method according to claim 4, wherein the graph filtering comprises: calculating, based on the graph matching, a specified subset of results under a filtering condition.

7. The method according to claim 6, wherein in the graph filtering, the filtering condition specifies a time window that is possibly different from a time window during the graph matching.

8. The method according to claim 4, wherein the graph association query language supports predicate filtering semantics, and matching based on edges with indefinite steps.

* * * * *